United States Patent
Tadla et al.

(10) Patent No.: US 11,477,859 B2
(45) Date of Patent: Oct. 18, 2022

(54) METHOD FOR AUTOMATIC PAIRING FOR COMMUNICATION BETWEEN A COOKING UTENSIL AND AN ELEMENT OF AN INDUCTION COOKTOP

(71) Applicant: SEB S.A., Ecully (FR)

(72) Inventors: Jérémy Tadla, Lozanne (FR); Louis Schmerber, Sherbrooke (CA)

(73) Assignee: SEB S.A.

( * ) Notice: Subject to any disclaimer, the term of this patent is extended or adjusted under 35 U.S.C. 154(b) by 521 days.

(21) Appl. No.: 16/523,011

(22) Filed: Jul. 26, 2019

(65) Prior Publication Data

US 2020/0045781 A1 Feb. 6, 2020

(30) Foreign Application Priority Data

Aug. 1, 2018 (FR) ...................... 1857231

(51) Int. Cl.
*H05B 6/06* (2006.01)
*A47J 36/32* (2006.01)

(52) U.S. Cl.
CPC ............ *H05B 6/062* (2013.01); *A47J 36/321* (2018.08); *H05B 2213/05* (2013.01)

(58) Field of Classification Search
CPC ... A47J 36/321; H05B 2213/05; H05B 6/062; H05B 2213/06; H04W 4/80; H04W 4/30
See application file for complete search history.

(56) References Cited

U.S. PATENT DOCUMENTS

2017/0230782 A1* 8/2017 Randjelovic .......... H04W 12/35

FOREIGN PATENT DOCUMENTS

| WO | WO 2015/092230 A1 | 6/2015 | |
| WO | WO-2015092230 A1 * | 6/2015 | ............ A47J 27/002 |
| WO | WO 2015/128578 A2 | 9/2015 | |

OTHER PUBLICATIONS

Search Report as issued in French Patent Application No. 1857231, dated May 20, 2019.

* cited by examiner

*Primary Examiner* — Dana Ross
*Assistant Examiner* — Kuangyue Chen
(74) *Attorney, Agent, or Firm* — Lerner, David, Littenberg, Krumholz & Mentlik, LLP

(57) ABSTRACT

A method for communication between a cooking utensil and an induction cooktop, includes: a step of arrangement of a cooking utensil on an element of the induction cooktop, a step of generation of a magnetic flux by the element on which the cooking utensil is arranged, a pairing request step including a sending of at least one pairing request frame by the communication module of the cooking utensil or the sending of at least one corresponding pairing request frame by the communication device of the induction cooktop, a step of listening by the communication device of the induction cooktop or, if applicable, by the communication module of the cooking utensil, the listening step including reception of the at least one pairing request frame or, if applicable, of the at least one corresponding pairing request frame, a pairing step between the cooking utensil and the induction cooktop including an exchange of information.

10 Claims, 1 Drawing Sheet

METHOD FOR AUTOMATIC PAIRING FOR COMMUNICATION BETWEEN A COOKING UTENSIL AND AN ELEMENT OF AN INDUCTION COOKTOP

CROSS-REFERENCE TO RELATED APPLICATIONS

This application claims priority to French Patent Application No. 1857231, filed on Aug. 1, 2018, the entire content of which is incorporated herein by reference in its entirety.

FIELD

This invention concerns a method for communication between a cooking utensil and an element of an induction cooktop.

BACKGROUND

It is known to have a cooking utensil comprising a device for measuring a magnetic field emitted by an element of an induction cooktop. This arrangement allows the cooking utensil to determine that it is close to the element.

It is also known to have a cooking utensil comprising a communication module configured to exchange information with a communication device of the induction cooktop.

This arrangement helps the user during the preparation of a recipe, because this communication brings together various information items concerning the cooking or the preparation of food in the recipe. For example, it is possible to determine if a food is in the process of being cooked.

It is also known to control the cooking remotely by means of the handle of the cooking utensil or to monitor the cooking remotely by retrieving information from a temperature sensor in the cooking utensil.

However, it may prove to be difficult to add a cooking utensil to a communication network comprising an induction cooktop.

In fact, the user must perform a certain number of manual steps which may prove to be tedious. For example, this is the case if these steps must be performed while preparing a recipe.

It is also known, for example from the document WO2015128578A2, to communicate an information item from a cooking utensil to an induction cooktop in a Bluetooth® (a wireless technology standard for exchanging data between fixed and mobile devices over short distances using short-wavelength UHF radio waves in the industrial, scientific and medical radio bands, from 2.400 to 2.485 GHz) low energy beacon communication mode not necessitating pairing between two specific appliances.

However, this communication mode is unidirectional, and it is not intended for secure information exchange between two specific appliances.

SUMMARY

An aspect of this invention aims to solve all or a portion of the drawbacks mentioned above.

In this regard, an aspect of the invention concerns a method for communication between a cooking utensil and an induction cooktop, the communication method comprising the following steps:

a step of arrangement of a cooking utensil on one of the elements of the induction cooktop, the cooking utensil comprising an energy source, a processing unit, a measuring device and a communication module, and the induction cooktop comprising a communication device, a step of generation of a magnetic flux by the element on which the cooking utensil is arranged, performed either following a direct indication to the induction cooktop on the part of the user relating to an identification of the element on which the cooking utensil is arranged, or following a substep of scanning by sequential generation of magnetic fluxes by the different elements of the induction cooktop until the measuring device of the cooking utensil detects the magnetic flux from the element on which the cooking utensil is arranged, a pairing request step comprising a sending of at least one pairing request frame according to a wireless communication protocol by the communication module of the cooking utensil, or the sending of at least one corresponding pairing request frame according to the wireless communication protocol by the communication device of the induction cooktop, the pairing request being triggered on the one hand by the induction cooktop during generation of the magnetic flux, and on the other hand by the cooking utensil during the detection of the magnetic flux from the element on which the cooking utensil is arranged, a step of listening by the communication device of the induction cooktop or, if applicable, by the communication module of the cooking utensil, the listening step comprising reception of the at least one pairing request frame or, if applicable, of the at least one corresponding pairing request frame, a pairing step between the cooking utensil and the induction cooktop comprising an exchange of information between the communication module of the cooking utensil and the communication device of the induction cooktop according to the wireless communication protocol, the information exchanged comprising in particular an indication of identification of the element on which the cooking utensil is arranged and an indication of identification of the cooking utensil.

When the cooking utensil is arranged on one of the elements of the induction cooktop, the pairing is performed without manual validation by the user at the level of the cooking utensil.

The communication method thus automates the establishment of a communication network according to the wireless communication protocol, because several cooking utensils can be installed on different elements. The communication method makes it possible to know which cooking utensil is associated with which element, without the need for the user to provide any specific information.

In fact, the user no longer needs to perform manual operations specific to the pairing between the cooking utensil and the element of the induction cooktop.

Optionally, however, the user may interact with the induction cooktop in order to give a direct indication of the element used.

According to an aspect of the invention, the direct indication corresponds to an information item sent to a central management system of the induction cooktop. In an embodiment, the central management system comprises a processor.

The communication method also brings flexibility to the communication network. A cooking utensil disconnected from this communication network can be reconnected automatically. The preparation of recipes will also include fewer manual operations to be performed by the user. These manual operations may correspond to the notification to the central management system that a cooking utensil is indeed arranged on the correct element.

"Generation of a magnetic flux" is understood to mean continuous emission of a magnetic flux, the sequential generation corresponding to a generation of a magnetic flux in turn by the elements of the induction cooktop.

According to an aspect of the invention, the communication device and/or the communication module are designed to exchange information according to a point-to-point communication mode.

According to an aspect of the invention, the induction cooktop comprises a user interface adapted to produce the direct indication following an interaction with the user. In an embodiment the user interface comprises a control element, in particular provided with at least one button, and a display unit such as a screen, adapted to display indications concerning the information exchanged by the induction cooktop and the cooking utensil. In particular, the control element is designed to send control information to the central management system.

The display unit may also or alternatively comprise at least one indicator light, for example, at least one light-emitting diode.

According to an aspect of the invention, the magnetic flux detected by the measuring device of the cooking utensil has an identification characteristic relating to the element on which the cooking utensil is arranged.

This arrangement makes it possible to secure the automatic pairing, because a recognition of the magnetic flux ensures that the pairing is performed between the cooking utensil and the element on which the cooking utensil is arranged.

According to an aspect of the invention, the scanning substep comprises a prior operation of awakening of the processing unit and of the communication module of the cooking utensil by a detection device of the cooking utensil, the detection device being designed to detect the magnetic flux emitted by the element on which the cooking utensil is arranged, the said detection device being arranged in the cooking utensil.

In other words, the awakening of the processing unit and of the communication module of the cooking utensil corresponds to the passage from a first operating mode, in which the processing unit and the communication module are not designed to operate according to all of their possibilities, to a second operating mode, in which the processing unit and the communication module are fully operational.

This arrangement limits the energy consumption of the cooking utensil since the operation of the processing unit and of the communication module can be reduced when no magnetic flux is detected.

According to an aspect of the invention, the device for detection of the magnetic flux emitted by the element comprises an electronic device designed to make the processing unit operational according to characteristics of the magnetic flux, when the detection device detects the magnetic flux.

According to an aspect of the invention, the measuring device comprises at least one temperature measurement module.

This arrangement allows measuring a temperature relating to the cooking performed by the cooking utensil. In an embodiment, the information exchanged during the pairing step comprises measurement information from the temperature measurement module.

According to one aspect of the invention, the measuring device comprises a coil comprising one or more turns. Thus, when a magnetic flux crosses the coil, a voltage is induced at the terminals of the coil. This induced voltage is the image of the magnetic flux.

In an embodiment, the coil comprises a single turn called the lead wire. In particular, the lead wire creates a loop configured to detect the presence of a magnetic field.

According to one possibility, the measuring device comprises a Negative Temperature Coefficient thermistor (NTC thermistor). The NTC thermistor with its connection wires forms a current loop. When a magnetic flux crosses this loop, an induced voltage, the image of this magnetic flux, appears at the terminals of the NTC thermistor.

According to another possibility, the magnetic field measuring device comprises a thermocouple. The thermocouple constitutes a current loop. If a magnetic flux crosses this loop, an induced voltage, the image of this flux, appears at the terminals of the thermocouple.

According to another possibility, the magnetic field measuring device is a magnetic field sensor. This sensor may be a Hall effect sensor or a magnetoresistive sensor. This sensor measures a level of magnetic field and thus detects the presence of magnetic flux in its near environment.

According to an aspect of the invention, the magnetic field measuring device is positioned in a cooking surface of the cooking utensil. In an embodiment, the magnetic field measuring device can be positioned in any part of the cooking utensil, such as the handle when the latter has one.

According to an aspect of the invention, the energy source comprises a power battery able to power the cooking utensil after an action on a device for powering up the cooking utensil, the energy source preferably comprising a device to recover energy from the magnetic flux of the element and able to recharge the power battery from the magnetic flux.

This arrangement makes it possible to use the cooking utensil independently of the induction cooktop because the battery allows energy to be stored.

According to an aspect of the invention, the energy recovery device comprises receiving coils designed to transmit the current thus recovered to the processing unit and/or to the communication module in order to power them, provided that the powering-up device is activated.

According to an aspect of the invention, the communication method comprises a step of activating the communication device of the induction cooktop, the activation step causing the communication device of the induction cooktop to emit the at least one corresponding pairing request frame and causing the reception of the at least one pairing request frame.

Thus the communication device of the induction cooktop cannot be activated continuously, that is, it cannot send and receive pairing request frames continuously.

This arrangement limits the energy use corresponding to the performance of the activation step.

According to one aspect of the invention, the activation step is performed following a step of detecting a loading of the induction cooktop.

This arrangement makes it possible to perform the activation step automatically as soon as a loading is detected.

According to an aspect of the invention, the detection of the loading is performed by means of a sensor of the induction cooktop. In an embodiment, the sensor is configured to detect a vibration of the induction cooktop, the vibration corresponding to the placement of the cooking utensil on the element of the induction cooktop.

According to an aspect of the invention, the wireless communication protocol is a radio frequency communication protocol, in particular Bluetooth Low Energy® (a wireless personal area network technology designed and marketed by the Bluetooth Special Interest Group (Bluetooth SIG) aimed at novel applications in the healthcare, fitness, beacons, security, and home entertainment industries. Bluetooth Low Energy technology operates in the same spectrum range (the 2.400-2.4835 GHz ISM band) as classic Bluetooth technology, but uses a different set of channels. Instead of the classic Bluetooth 79 1-MHz channels, Bluetooth Low Energy has 40 2-MHz channels. Further details are given in Volume 6 Part A (Physical Layer Specification) of the Bluetooth Core Specification V4.0).

According to an aspect of the invention, the cooking utensil comprises a handle in which are provided the energy source, the processing unit and the communication module.

According to an aspect of the invention, the power battery is contained in a handle of the cooking utensil or in a cooking surface of the cooking utensil able to cooperate with the element.

According to an aspect of the invention, the handle is removable.

This arrangement makes it possible to use the handle with several different containers in order to form a different cooking utensil each time.

According to an aspect of the invention, the steps of the communication method as previously described can be performed for multiple elements of the induction cooktop with multiple cooking utensils, in particular simultaneously or such that different steps of multiple communication methods relative to multiple cooking utensils are overlapping.

According to an aspect of the invention, the cooking utensils may be any types of appliances compatible with induction elements. For example: frying pans, saucepans, pressure cookers, cookers, steam cookers, kettles, Dutch ovens, skillets, grills, tajines, woks, couscoussiers, fondue sets, etc.

According to an aspect of the invention, each cooking utensil consists of the same components and each element of the induction cooktop consists of the same components, such that the communication method described above can be implemented according to all possible combinations of cooking utensils and elements.

According to an aspect of the invention, the processing unit is an electronic unit capable of performing primary logic operations on input signals and of returning a result of this operation as output.

In an embodiment, the processing unit and the communication module are contained in the handle.

According to an aspect of the invention, the processing unit is configured to be wirelessly and remotely programmable by a portable communication terminal. The data exchange between the memory of the processing unit and the portable communication terminal can take place in both directions. A user can then remotely control the signal processing unit.

According to an aspect of the invention, the cooking utensil is configured to transmit a specified information item relating to the operation of the element on which the cooking utensil is arranged according to the wireless communication protocol.

According to an aspect of the invention, the processing unit and/or the communication module can be removed from the rest of the cooking utensil.

According to an aspect of the invention, the cooking utensil also comprises a display unit connected to the processing unit. In an embodiment, the display unit makes it possible to view the information contained in the processing unit.

In an embodiment, the display unit is contained in the handle and/or the display unit can be removed from the handle and from the processing unit.

According to an aspect of the invention, the processing unit comprises a processor. According to an aspect of the invention, the induction cooktop comprises a central management system configured to control the operation of the element, of the communication device, of the sensor and/or of the additional element. For example, the central management system comprises a processor.

Where they are not incompatible, the various aspects defined above can be combined.

BRIEF DESCRIPTION OF THE FIGURES

The invention will be more fully understood by means of the detailed description presented below in regard to the attached drawing in which.

DETAILED DESCRIPTION

In the following detailed description of the figures defined above, the same components or the components fulfilling identical functions may retain the same references so as to simplify the understanding of the invention.

Figure 1:
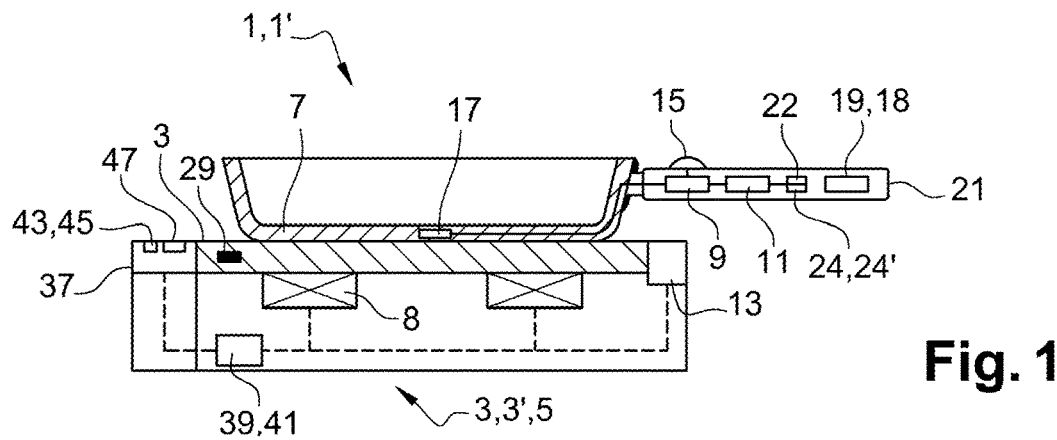
FIG. 1 is a schematic sectional view of a cooking utensil and of an induction cooktop.
Figure 2:
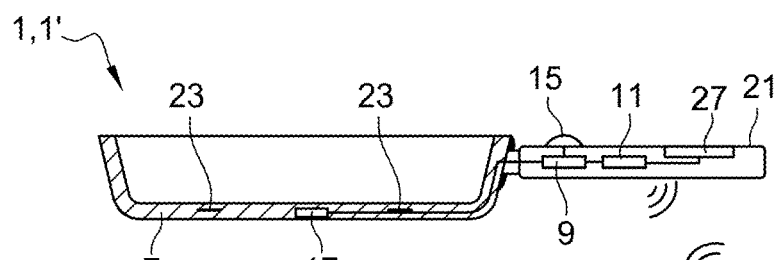
FIG. 2 is a schematic sectional view of the cooking utensil and of the portable communication terminal.
Figure 3:
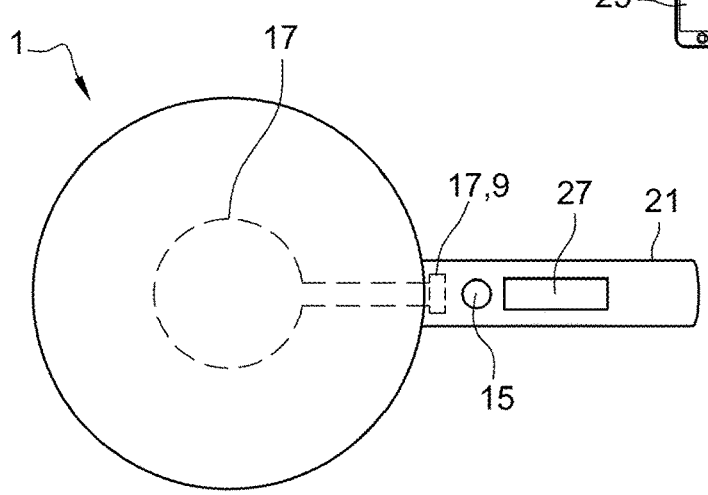
FIG. 3 is a schematic top view of the cooking utensil.

As illustrated in FIGS. 1 to 3, a cooking utensil 1 is designed to be arranged on an element 3 of an induction cooktop 5. The element 3 cooperates with a cooking surface 7 of the cooking utensil 1 so as to produce cooking. To do this, the element has coils 8.

The element 3 is designed to generate a magnetic flux having an identification characteristic such that it is possible to identify the element 3.

The cooking utensil 1 may be, for example: a frying pan, a saucepan, a pressure cooker, a cooker, a steam cooker, a kettle, a Dutch oven, a skillet, a grill, a tajine, a wok, a couscoussier, a fondue set, etc.

The cooking utensil 1 comprises a processing unit 9, a communication module 11 configured to exchange information with a communication device 13 of the induction cooktop 5. The cooking utensil 1 further comprises a powering-up device 15 designed to power up the processing unit 9 and the communication module 11.

The processing unit 9 is an electronic unit including circuitry (e.g. one more electronic circuits) capable of performing primary logic operations on input signals and of returning a result of this operation as output. The processing unit 9 may also include a non-transitory memory (broadly termed a non-transitory machine storage medium) or may be in communication with a non-transitory memory coded with machine readable instructions to be executed by the processing unit 9 to carry out its functions.

The cooking utensil 1 also comprises a measuring device 17 adapted to detect magnetic fluxes or magnetic fields.

The measuring device 17 is a coil comprising a turn. Thus, when a magnetic flux crosses the coil, a voltage is induced at the terminals of the coil. This induced voltage is the image of the magnetic flux.

The coil comprises a single turn called the lead wire. The lead wire creates a loop configured to detect the presence of a magnetic field.

According to another possibility, the magnetic field measuring device 17 may be a Negative Temperature Coefficient thermistor (NTC thermistor). The NTC thermistor with its connection wires forms a current loop. When a magnetic flux crosses this loop, an induced voltage, the image of this magnetic flux, appears at the terminals of the NTC thermistor.

According to another possibility, the magnetic field measuring device 17 may be a thermocouple. The thermocouple constitutes a current loop. If a magnetic flux crosses this loop, an induced voltage, the image of this flux, appears at the terminals of the thermocouple.

According to another possibility, the magnetic field measuring device 17 may be a magnetic field sensor. This sensor may be a Hall effect sensor or a magnetoresistive sensor. This sensor measures a level of magnetic field and thus detects the presence of magnetic flux in its near environment.

The measuring device 17 is positioned in the cooking surface 7 of the cooking utensil.

The measuring device 17 also comprises at least one temperature measuring module to measure a temperature relating to the cooking performed by the cooking utensil 1.

The cooking utensil 1 also comprises an energy source 18, such as a power battery 19 arranged in a handle 21 of the cooking utensil 1. Optionally, the cooking appliance 1 may comprise an energy recovery device 22 provided with receiving coils 23 designed to transmit a current recovered at the element to the power battery 19. The current is recovered from a magnetic flux produced by the element 3.

The cooking utensil 1 also comprises a detection device 24 adapted to detect a magnetic flux emitted by the element 3 on which the cooking utensil 1 is arranged.

The device 24 for detection of the magnetic flux emitted by the element 3 comprises an electronic device 24' designed to make the processing unit 9 operational according to the characteristics of the magnetic flux, when the detection device 24 detects the magnetic flux.

The handle 21 may be fixed or removable with regard to the rest of the cooking utensil 1. The processing unit 9 and the communication module 11 are contained in the handle 21.

The processing unit 9 is configured to be wirelessly and remotely programmable by a portable communication terminal 25. The data exchange between the memory of the processing unit 9 and the portable communication terminal 25 can take place in both directions. A user can then remotely control the processing unit 9. For example, the processing unit 9 may include dedicated circuitry for receiving and transmitting data (e.g. an emitter and a receiver) with the portable communication terminal 25. Programming the processing unit 9 can take place, in an embodiment, by sending code instructions to the processing unit 9. For example, the code instructions may be received by the receiver of the processing unit 9 and then stored in the non-transitory memory of the processing unit 9 for later execution by the processor of the processing unit 9.

The cooking utensil 1 is configured to transmit a specified information item relating to the operation of the element 3 on which the cooking utensil 1 is arranged.

The cooking utensil 1 also comprises a display unit 27 connected to the processing unit 9. The display unit 27 makes it possible to view the information contained in the processing unit 9.

In particular, the display unit 27 is contained in the handle 21 and/or the display unit 27 can be removed from the handle 21 and from the processing unit 9. The processing unit 9 comprises a processor.

The induction cooktop 5 further comprises a sensor 29 configured to detect a loading of the induction cooktop 5. The sensor 29 is configured to detect a vibration corresponding to the placement of the cooking utensil 1 on the element 3.

The induction cooktop 5 also comprises a central management system 39 configured to control the operation of the elements 3, of the communication device 13 and of the sensors 29, the central management system 39 comprising a processor 41.

The central management system 39 may also include a dedicated non-transitory memory for storing code instructions to be executed by the processor 41 to perform the functions of the central management system 39.

The induction cooktop 5 comprises a user interface 37 making it possible to control the operation of the element 3. The user can also use this user interface 37 to enter a direct indication relating to an identification of the element 3 on which the cooking utensil 1 is arranged.

The direct indication corresponds to an information item sent to the central management system 39 of the induction cooktop 5.

The user interface 37 comprises a control element 43, in particular provided with at least one button 45, and a display unit 47 such as a screen, able to display indications relating to the information exchanged by the induction cooktop 5 and the cooking utensil 1. In particular, the control element 43 is designed to send control information to the central management system 39. The control element 43 may be connected to the central management system 39 using wires.

The induction cooktop 5 may comprise multiple elements 3, 3' as described previously. Thus, the induction cooktop 5 comprises an additional element 3' configured to generate an additional magnetic flux having an additional identification characteristic.

Alternatively, the elements 3, 3' may all present the same identification characteristic without posing a problem, given that the induction cooktop 5 is able to determine which element 3, 3' is being used.

Several cooking utensils 1, 1' can cooperate with the induction cooktop 5. In the remainder of the text in reference to the figures, it is considered that the cooking utensil 1 is arranged on the element 3, in order to simplify the drafting. However, all combinations between the cooking utensils 1, 1' and the elements 3, 3' are envisioned, the method described being identical.

Figure 4:
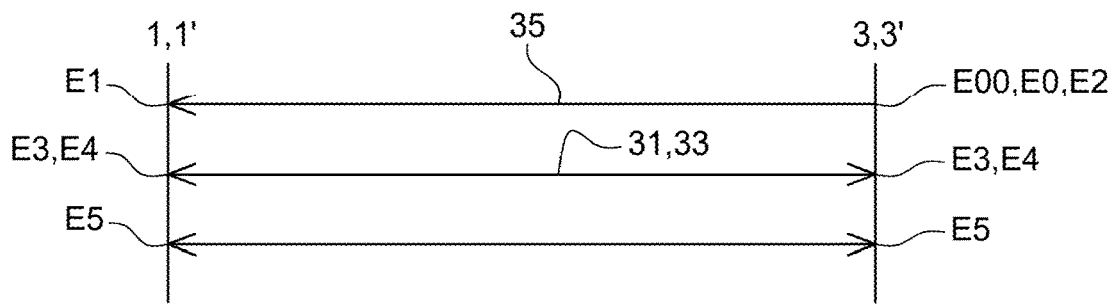
FIG. 4 is a diagram representing the steps of a method of communication between the cooking utensil and the induction cooktop.

As illustrated in FIG. 4, a method of communication between the cooking utensil 1 or the additional cooking utensil 1' on the one hand, and the element 3 or the additional element 3' on the other hand, comprises the steps described below.

A step E0 of activation of the communication device 13 of the induction cooktop 5 consists of causing the reception of at least one pairing request 31 emitted by the communication module 11 and the emission by the communication device 13 of at least one corresponding pairing request 33. In an embodiment, each of the communication module 11 and communication device 13 includes dedicated circuitry for emitting and receiving (e.g. emitter and receiver) the pairing requests 31, 33.

The at least one pairing request frame 31 and the at least one corresponding pairing request frame 33 are emitted according to a wireless communication protocol. The wireless communication protocol is a radio frequency communication protocol, in particular Bluetooth Low Energy® (e.g. in accordance with the specification of the Bluetooth Core Specification V.4). The pairing between the communication module 11 and the communication device 13 can be done according to known methods that use conventional wireless communication protocols such as Bluetooth Low Energy®.

The activation step E0 is performed following a step E00 of detection of a loading of the induction cooktop 5 in order to perform the activation step E0 automatically as soon as a loading is detected.

The detection of a loading is performed by means of the sensor 29 of the induction cooktop 5 configured to detect a vibration of the induction cooktop 5, the vibration corresponding to the placement of the cooking utensil 1 on the element 3 of the induction cooktop 5.

Alternatively, the activation step E0 may be performed following a manual start of the induction cooktop 5. In this case, the sensor 29 is not necessary.

A step E1 of arrangement of a cooking utensil 1 on one of the elements 3 of the induction cooktop 5 is then performed.

A step E2 of generation of a magnetic flux 35 by the element 3 on which the cooking utensil 1 is arranged is then performed. This step follows either a direct indication to the induction cooktop 5 on the part of the user relating to an identification of the element 3 on which the cooking utensil 1 is arranged, or a substep of scanning by sequential generation of magnetic fluxes 35 by the different elements 3, 3' of the induction cooktop 5 until the measuring device 17 detects the magnetic flux 35 from the element 3 on which the cooking utensil 1 is arranged.

The scanning substep comprises a prior operation of awakening of the processing unit 9 and of the communication module 11 of the cooking utensil 1 by a detection device 24 of the cooking utensil 1. The detection device is designed to detect the magnetic flux 35 emitted by the element 3 on which the cooking utensil 1 is arranged.

A pairing request step E3 comprises a sending of the at least one pairing request frame 31 or the sending of the at least one corresponding pairing request frame 33.

The pairing request is triggered on the one hand by the induction cooktop 5 during generation of the magnetic flux 35, and on the other hand by the cooking utensil 1 during the detection of the magnetic flux 35 from the element 3 on which the cooking utensil 1 is arranged.

A listening step E4 is then performed by the communication device 13 of the induction cooktop 5 or, if applicable, by the communication module 11 of the cooking utensil 1.

The listening step E4 comprises a reception of the at least one pairing request frame 31 or, if applicable, of the at least one corresponding pairing request frame 33.

A step E5 of pairing between the cooking utensil 1 and the induction cooktop 5 comprises an exchange of information between the communication module 11 of the cooking utensil land the communication device 13 of the induction cooktop 5 according to the wireless communication protocol.

The information exchanged comprises in particular an indication of identification of the element 3 on which the cooking utensil 1 is arranged and an indication of identification of the cooking utensil 1.

The communication method thus described makes it possible to limit the manipulations required to establish bidirectional communication between the cooking utensil land the induction cooktop 5.

It is therefore easy to add a cooking utensil 1 to a communication network according to the communication protocol used. In fact, the induction cooktop 5 can exchange information with multiple cooking utensils 1, 1'.

When communication with a cooking utensil 1, 1' is interrupted, this communication is then automatically re-established, because the communication method described above does not necessitate manipulation on the part of the user and can be performed automatically.

As goes without saying, the invention is not limited only to the form of execution described above as an example; on the contrary, it encompasses all embodiment variants.

The invention claimed is:

1. A method for communication between a cooking utensil and an induction cooktop, the communication method comprising:

a step of arrangement of the cooking utensil on one of the elements of the induction cooktop, the cooking utensil comprising an energy source, a processing unit, a measuring device and a communication module, and the induction cooktop comprising a communication device, a step of generation of a magnetic flux by the element on which the cooking utensil is arranged, performed either following a direct indication to the induction cooktop on the part of a user relating to an identification of the element on which the cooking utensil is arranged, or following a substep of scanning by sequential generation of magnetic fluxes by the different elements of the induction cooktop until the measuring device of the cooking utensil detects the magnetic flux from the element on which the cooking utensil is arranged, a pairing request step comprising a sending of at least one pairing request frame according to a wireless communication protocol by the communication module of the cooking utensil, or the sending of at least one corresponding pairing request frame according to the wireless communication protocol by the communication device of the induction cooktop, the pairing request being triggered by the induction cooktop during generation of the magnetic flux, and by the cooking utensil during the detection of the magnetic flux from the element on which the cooking utensil is arranged, a step of listening by the communication device of the induction cooktop or, if applicable, by the communication module of the cooking utensil, the listening step comprising reception of the at least one pairing request frame or, if applicable, of the at least one corresponding pairing request frame, a pairing step between the cooking utensil and the induction cooktop comprising an exchange of information between the communication module of the cooking utensil and the communication device of the induction cooktop according to the wireless communication protocol, the information exchanged comprising in particular an indication of identification of the element on which the cooking utensil is arranged and an indication of identification of the cooking utensil, wherein the scanning substep comprises a prior operation of awakening of the processing unit and of the communication module of the cooking utensil by a detection device of the cooking utensil, the detection device configured to detect the magnetic flux emitted by the element on which the cooking utensil is arranged, the detection device being arranged in the cooking utensil.

2. The communication method according to claim 1, wherein the detection device comprises an electronic device designed to make the processing unit operational according to the characteristics of the magnetic flux, when the detection device detects the magnetic flux.

3. The communication method according to claim 1, wherein the measuring device comprises at least one temperature measurement module.

4. The communication method according of claim 1, wherein the energy source comprises a power battery adapted to power the cooking utensil after an action on a device for powering up the cooking utensil.

5. The communication method according to claim 4, wherein the energy source comprises a device to recover energy from the magnetic flux of the element and adapted to recharge the power battery from the magnetic flux.

6. The communication method according to claim 1, comprising a step of activating the communication device of the induction cooktop, the activation step causing the communication device of the induction cooktop to emit the at least one corresponding pairing request frame and causing the reception of the at least one pairing request frame.

7. The communication method according to claim 1, wherein the wireless communication protocol is a radio frequency communication protocol.

8. The communication method according to claim 7, wherein the radio frequency communication protocol is according to Bluetooth Low Energy®.

9. The communication method according to claim 1, wherein the cooking utensil comprises a handle in which are provided the energy source, the processing unit, and the communication module.

10. The communication method according to claim 7, wherein the handle is removable.

* * * * *